(12) United States Patent
Ishihara et al.

(10) Patent No.: US 11,300,210 B2
(45) Date of Patent: Apr. 12, 2022

(54) MECHANICAL SEAL

(71) Applicants: Eagle Industry Co., Ltd., Tokyo (JP); EagleBurgmann Japan Co., Ltd., Tokyo (JP)

(72) Inventors: Hiroyuki Ishihara, Tokyo (JP); Hideki Maruyama, Tokyo (JP)

(73) Assignees: Eagle Industry Co., Ltd., Tokyo (JP); EagleBurgmann Japan Co., Ltd., Tokyo (JP)

( * ) Notice: Subject to any disclaimer, the term of this patent is extended or adjusted under 35 U.S.C. 154(b) by 163 days.

(21) Appl. No.: 16/621,062

(22) PCT Filed: Jun. 20, 2018

(86) PCT No.: PCT/JP2018/023465
§ 371 (c)(1),
(2) Date: Dec. 10, 2019

(87) PCT Pub. No.: WO2018/235868
PCT Pub. Date: Dec. 27, 2018

(65) Prior Publication Data
US 2020/0200276 A1    Jun. 25, 2020

(30) Foreign Application Priority Data

Jun. 23, 2017    (JP) .............................. JP2017-123091

(51) Int. Cl.
*F16J 15/36*    (2006.01)
*F16J 15/34*    (2006.01)

(52) U.S. Cl.
CPC ....... *F16J 15/3464* (2013.01); *F16J 15/3452* (2013.01)

(58) Field of Classification Search
CPC ...... F16J 15/34; F16J 15/3452; F16J 15/3464; F16J 15/3404; F16J 15/348
See application file for complete search history.

(56) References Cited

U.S. PATENT DOCUMENTS 5,375,852 A * 12/1994 Charhut ............... F16J 15/3404
277/371
5,558,343 A    9/1996 Aparicio, Jr.
(Continued)

FOREIGN PATENT DOCUMENTS

CN    101228379 A    7/2008
CN    204477089 U    7/2015
(Continued)

OTHER PUBLICATIONS

Extended European Search Report dated Feb. 10, 2021 (corresponding to EP18820715.3).
(Continued)

*Primary Examiner* — Gilbert Y Lee
(74) *Attorney, Agent, or Firm* — Harness, Dickey & Pierce, P.L.C.

(57) ABSTRACT

A mechanical seal which can provide stable sealing performance over a long period of time. A rotating ring unit 100 includes an annular elastic seal 130 having a first annular part 131 to which a rotating ring 110 is fitted and thus fixed on an inner circumferential surface side thereof, a second annular part 133 provided in close contact with an outer circumferential surface of a rotating shaft, and a curved part 132 which connects the first and second annular parts 131 and 133 and follows a positional change of the second annular part 133 with respect to the first annular part 131, an annular tightening member 140 which tightens an outer circumferential surface of the second annular part 133 on the rotating shaft, and a metal case 120 including an annular fitting part 121 to which the first annular part 131 is fitted and thus fixed on the inner circumferential surface side thereof.

5 Claims, 10 Drawing Sheets

(56) References Cited

U.S. PATENT DOCUMENTS

| | | | |
|---|---|---|---|
| 6,341,781 B1 | 1/2002 | Matz et al. | |
| 6,655,694 B1* | 12/2003 | Nakano | F16J 15/36 |
| | | | 277/370 |
| 2005/0077685 A1* | 4/2005 | Roddis | F16J 15/348 |
| | | | 277/390 |
| 2009/0249865 A1 | 10/2009 | Takigahira | |
| 2012/0161510 A1* | 6/2012 | Diekevers | F16J 15/344 |
| | | | 305/104 |
| 2016/0281856 A1 | 9/2016 | Itadani et al. | |
| 2016/0363225 A1 | 12/2016 | Cox et al. | |

FOREIGN PATENT DOCUMENTS

| | | |
|---|---|---|
| CN | 105864432 A | 8/2016 |
| GB | 618167 A | 2/1949 |
| JP | H02-225883 A | 9/1990 |
| JP | H03-098371 U | 10/1991 |
| JP | H04-066461 U | 6/1992 |
| JP | H07-038818 U | 7/1995 |

OTHER PUBLICATIONS

Chinese Office Action dated Nov. 3, 2020 (corresponding to CN 201880038748.7).

* cited by examiner

MECHANICAL SEAL

CROSS-REFERENCE TO RELATED APPLICATIONS

This application is a National Stage of International Application No. PCT/JP2018/023465, filed Jun. 20, 2018 (now WO 2018/235868A1), which claims priority to Japanese Application No. 2017-123091, filed Jun. 23, 2017. The entire disclosures of each of the above applications are incorporated herein by reference.

FIELD

The present disclosure relates to a mechanical seal having a fixed ring and a rotating ring.

BACKGROUND

Techniques employing a bellows seal have been known for sealing an annular gap between a rotating shaft and a rotating ring in a mechanical seal (see PTL 1 and PTL 2). Such techniques generally adopt a case for fixing a bellows seal. The case often has a structure for directly fixing the rotating ring so that the rotating ring does not rotate relative to the rotating shaft or the case in the circumferential direction. Since such a configuration involves a complicated structure of the rotating ring or other elements, the bellows seal is fixed to the case by fitting, and the rotating ring is fixed to the bellows seal by fitting in some cases. Such a conventional mechanical seal will be described with reference to FIGS. 10 and 11.

Figure 10:
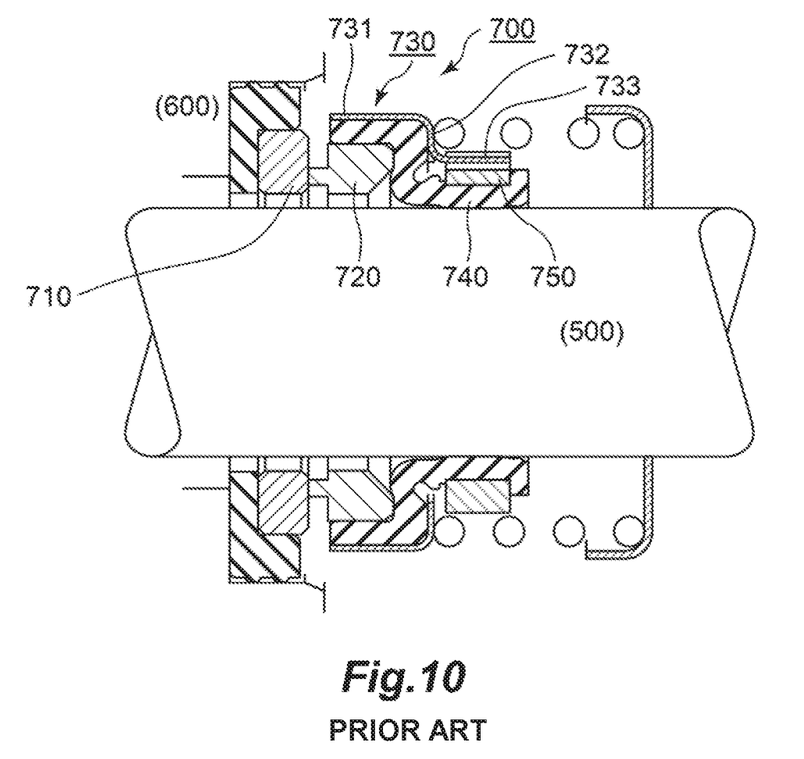
FIG. 10 is a schematic sectional view illustrating a conventional mechanical seal in use.
Figure 11:
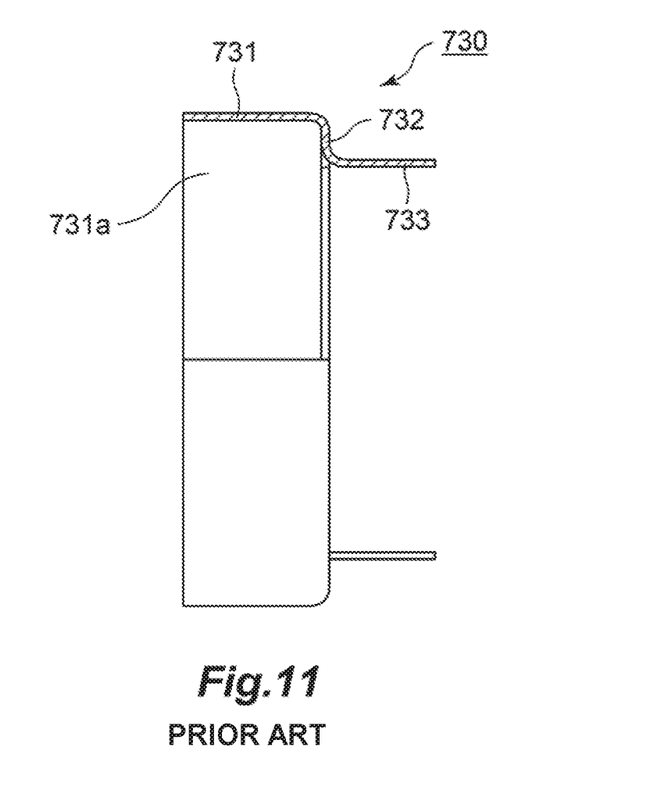
FIG. 11 is a partly sectional view of a conventional case.

FIG. 10 is a schematic sectional view illustrating a mechanical seal of a conventional technique in use. FIG. 11 is a partly sectional view of a case of the conventional technique. The mechanical seal 700 is used to seal an annular gap between the rotating shaft 500 and a housing 600 having a shaft hole for the rotating shaft 500. The mechanical seal 700 includes a fixed ring 710 fixed to the housing 600, a rotating ring 720 configured to slide on the fixed ring 710, a case 730, and a bellows seal 740 which seals the annular gap between the rotating shaft 500 and the rotating ring 720. The mechanical seal 700 also includes a tightening member 750 which tightens the bellows seal 740 on the rotating shaft 500.

The case 730 includes an annular fitting part 731 to which the bellows seal 740 is fitted and thus fixed on the inner circumferential side thereof and an inward flange part 732 extending radially inwardly from an end of the fitting part 731. The case 730 also includes engaging protrusions 733 each extending from an end of the inward flange part 732 to a side opposite to the rotating ring 720 side and being configured to engage an engagement part in the tightening member 750. The engaging protrusions 733 are provided at intervals in the circumferential direction.

The bellows seal 740 of the mechanical seal 700 is fitted and thus fixed to the fitting part 731 of the case 730, and the rotating ring 720 is fitted and thus fixed to the bellows seal 740. Employing such a configuration makes it possible to use a less complicated structure of the rotating ring or other elements.

The engaging protrusion 733 of the mechanical seal 700 is engaged with the engagement part in the tightening member 750, so that the case 730 and the bellows seal 740 are restrained from rotating relatively to each other. However, as the bellows seal 740 deteriorates over time or the like, a sealing-target fluid may come into the fitted part between the fitting part 731 of the case 730 and the bellows seal 740. Since the inner circumferential surface 731a of the fitting part 731 is smooth and slippery, the bellows seal 740 may slip on the inner circumferential surface 731a. More specifically, the bellows seal 740 may slide on the case 730 in the rotation direction at a part of the inner circumferential surface 731a of the fitting part 731. This can lower the sealing efficiency.

CITATION LIST

Patent Literature

[PTL 1] Japanese Utility Model Application Publication No. H03-98371

[PTL 2] Japanese Utility Model Application Publication No. H04-66461

SUMMARY

Technical Problem

The present disclosure provides a mechanical seal with stable sealing performance over a long period of time.

Solution to Problem

In order to solve the problem, the following means has been employed.

More specifically, a mechanical seal according to the present disclosure is a mechanical seal which seals an annular gap between a rotating shaft and a housing having a shaft hole for the rotating shaft, the mechanical seal including: a fixed ring fixed to the housing; and a rotating ring unit which includes a rotating ring configured to slide on the fixed ring and rotates together with the rotating shaft, the rotating ring unit including: an annular elastic seal having a first annular part to which the rotating ring is fitted and thus fixed on an inner circumferential surface side thereof, a second annular part provided in close contact with an outer circumferential surface of the rotating shaft, and a curved part which connects the first and second annular parts and is configured to follow a positional change of the second annular part with respect to the first annular part; an annular tightening member which tightens an outer circumferential surface of the second annular part on the rotating shaft; and a metal case including an annular fitting part to which the first annular part is fitted and thus fixed on an inner circumferential surface side thereof, wherein the fitting part includes a slipping stopper formed on an inner circumferential surface thereof, the slipping stopper being configured to restrain the first annular part from rotating relatively in the circumferential direction.

According to the present disclosure, the fitting part of the case includes the slipping stopper formed on the inner circumferential surface thereof, and thus the elastic seal can be restrained from rotating relatively to the inner circumferential surface of the fitting part.

The case may include an inward flange part extending radially inwardly from an end of the fitting part and an engaging protrusion extending from an end of the inward flange part to a side opposite to the rotating ring side and being configured to engage an engagement part provided in the tightening member.

The slipping stopper may be a knurled part, a shot blasted part, or may include a plurality of recesses or protrusions extending along an axial line.

The above-described features may be applied in as many combinations as possible.

Advantageous Effects of the Disclosure

As described above, according to the present disclosure, the sealing performance can be kept stable over a long period of time.

DETAILED DESCRIPTION

Modes for carrying out the present disclosure will be described in detail in conjunction with the accompanying drawings by referring to an exemplary embodiment. Note however that the sizes, materials, shapes, and their relative arrangements according to the embodiment are not intended to limit the scope of the present disclosure unless otherwise specified.

Embodiment

Figure 1:
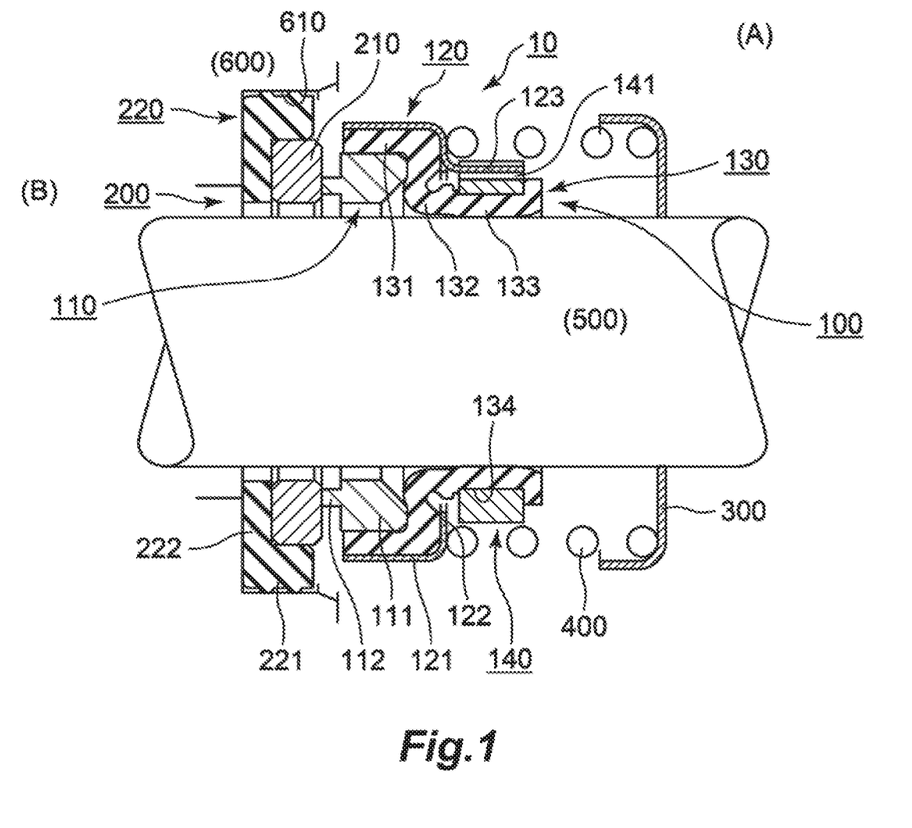
FIG. 1 is a schematic sectional view illustrating a mechanical seal in use according to an embodiment.
Figure 2:
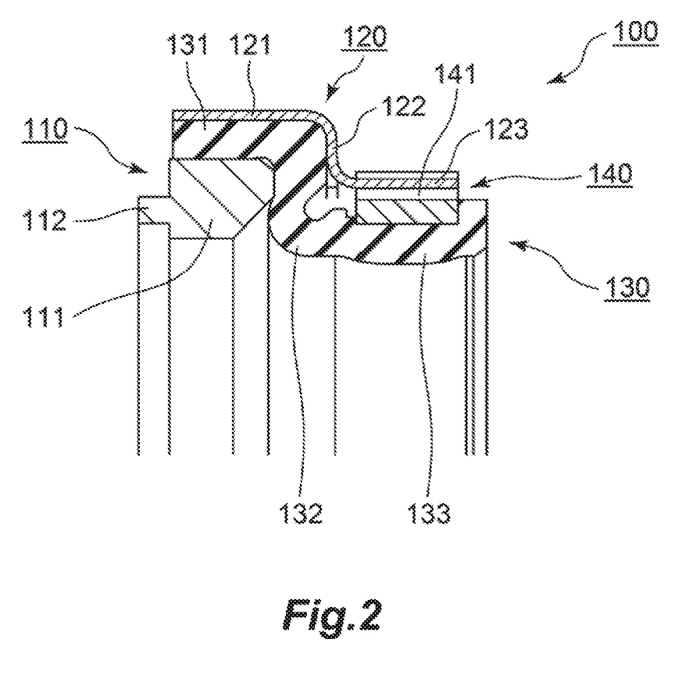
FIG. 2 is a schematic sectional view of a rotating ring unit according to the embodiment.
Figure 3:
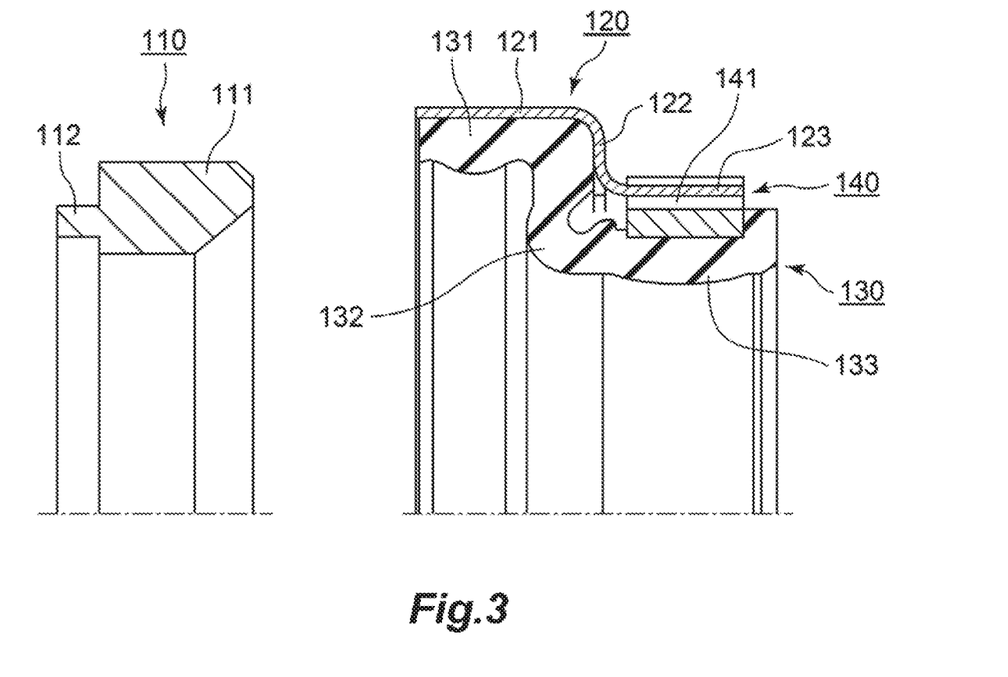
FIG. 3 is a schematic sectional view illustrating parts of the rotating ring unit separately according to the embodiment.
Figure 4:
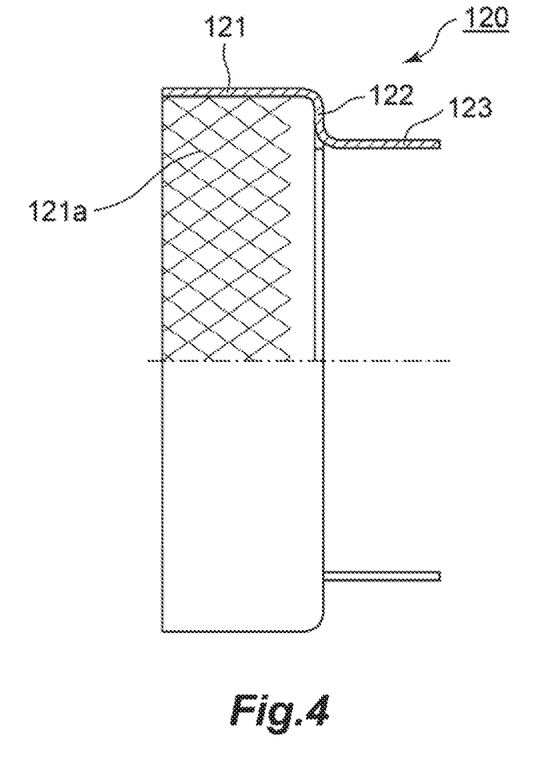
FIG. 4 is a schematic sectional view of a case according to the embodiment.

With reference to FIGS. 1 to 4, a mechanical seal according to an embodiment of the present disclosure will be described. FIG. 1 is a schematic sectional view illustrating the mechanical seal in use according to the embodiment. The mechanical seal has a rotationally symmetrical shape excluding some members thereof, and FIG. 1 is a sectional view of the mechanical seal taken along a plane including the central axis of the mechanical seal. FIG. 2 is a schematic sectional view of a rotating ring unit according to the embodiment. FIG. 2 is a sectional view of the rotating ring unit taken along the central axis of the mechanical seal. FIG. 3 is a schematic sectional view illustrating parts of the rotating ring unit separately. FIG. 3 is a sectional view of the rotating ring unit taken along a plane including the central axis of the mechanical seal. FIG. 4 is a schematic sectional view of a case according to the embodiment of the present disclosure. The part of FIG. 4 above the central axis of the mechanical seal illustrates a section of the case taken along the central axis, and the part below the central axis illustrates the outer appearance of the case. In the following description, the axial line direction refers to the direction in which the central axis of the mechanical seal extends.

<Mechanical Seal>

The mechanical seal will be described. The mechanical seal 10 serves to seal an annular gap between a rotating shaft 500 and a housing 600 having a shaft hole for the rotating shaft 500. As illustrated in FIG. 1, the mechanical seal 10 seals the annular gap between the rotating shaft 500 and the housing 600, so that the region in the right part (A) of the figure and the region (B) in the left part of the figure are separated. This embodiment is used such that a sealing-target fluid is sealed in the region (A) and the region (B) is located on the atmospheric side.

The mechanical seal 10 includes a rotating ring unit 100 and a fixed ring unit 200. The rotating ring unit 100 is configured to rotate together with the rotating shaft 500. The fixed ring unit 200 is fixed to the housing 600. The fixed ring unit 200 includes a cylindrical fixed ring 210 and a gasket 220.

The fixed ring 210 is made of a hard material such as SiC, carbon, and a metal. The end surface of the fixed ring 210 on the rotating ring unit 100 side (on the right side in FIG. 1) serves as a sliding surface on the rotating ring 110. The gasket 220 includes a cylindrical part 221 and an inward flange part 222 provided at an end of the cylindrical part 221. The fixed ring 210 is fitted to an inner circumferential surface of the cylindrical part 221 and thus fixed to the gasket 220. Thus, the fixed ring 210 is fixed to the housing 600 by the gasket 220.

The fixed ring unit 200 is fitted and thus fixed to an annular notch 610 provided on an end surface side of the housing 600. An outer circumferential surface of the cylindrical part 221 of the gasket 220 is brought into close contact with an inner circumferential surface of the notch 610, so that an annular gap between the gasket 220 and the housing 600 is sealed.

The rotating ring unit 100 includes a rotating ring 110, a metal case 120, an elastic seal 130 provided to seal an annular gap between the rotating ring 110 and the rotating shaft 500, and a tightening member 140 used to bring the elastic seal 130 into close contact with the rotating shaft 500.

The rotating ring 110 is made of a hard material such as SiC, carbon, and a metal. The rotating ring 110 includes a cylindrical part 111 in a substantially cylindrical shape and an annular protrusion 112 which protrudes from an end surface of the cylindrical part 111. The end surface of annular protrusion 112 slides on the fixed ring 210.

The elastic seal 130 is a bellows seal of a rubber type elastic material. The elastic seal 130 includes a first annular part 131, a second annular part 133 in close contact with an outer circumferential surface of the rotating shaft 500, and a curved part 132 which connects the first annular part 131 and the second annular part 133. The rotating ring 110 is fitted and thus fixed on an inner circumferential part of the first annular part 131. The curved part 132 is deformable in a flexible manner and can follow a positional change of the second annular part 133 with respect to the first annular part 131. Thus, if there is an eccentricity or a positional shift in the axial direction of the rotating shaft 500 with respect to the housing 600, the second annular part 133 can be kept in close contact with the outer circumferential surface of the rotating shaft 500. Thus, the second annular part 133 can follow the movement of the rotating shaft 500 with respect to the housing 600.

The tightening member 140 is made of an annular metal member. The tightening member 140 tightens an outer circumferential surface of the second annular part 133 of the elastic seal 130 on the rotating shaft 500, so that the second annular part 133 can be kept in close contact with the rotating shaft 500. A plurality of grooves 141 as engagement parts are provided at intervals in the circumferential direction on an outer circumferential surface side of the tightening member 140. The grooves 141 are provided to extend from an end surface on one end side to an end surface on the other end side in the axial direction on the outer circumferential surface side of the tightening member 140.

The case 120 includes an annular fitting part 121, an inward flange part 122 which extends radially inwardly from an end of the fitting part 121 and an engaging protrusion 123 which extends from the end of the inward flange part 122 to a side opposite to the rotating ring 110 side. The first annular part 131 of the elastic seal 130 is fitted and thus fixed to an inner circumferential surface of the fitting part 121. The engaging protrusion 123 is configured to engage the groove 141 provided in the tightening member 140. A plurality of such engaging protrusions 123 are provided at intervals in the circumferential direction. The plurality of engaging protrusions 123 are engaged with the plurality of grooves 141 provided in the tightening member 140 respectively. Thus, the case 120 can be restrained from rotating relatively to the tightening member 140.

The mechanical seal 10 includes a spring holder 300 fixed to the rotating shaft 500 and a coil spring 400 attached to the spring holder 300. The spring holder 300 is made of an annular metal member. The coil spring 400 is mounted in a state where the coil spring is held between the spring holder 300 and the inward flange part 122 of the case 120. The coil spring 400 presses the rotating ring 110 toward the fixed ring 210 by the case 120 and the elastic seal 130. Thus, the rotating ring 110 and the fixed ring 210 are kept in close contact with each other.

The fitting part 121 of the case 120 includes a slipping stopper formed on the inner circumferential surface thereof and the slipping stopper is configured to restrain the first annular part 131 of the elastic seal 130 from rotating relatively in the circumferential direction. The slipping stopper includes a knurled part 121a obtained by knurling processing. The difference in height between a peak and a valley of the knurled part 121a is set to 0.03 mm or larger.

Advantages Provided by Mechanical Seal According to Embodiment

The mechanical seal 10 has the knurled part 121a as a slipping stopper formed at the inner circumferential surface of the fitting part 121 of the case 120, so that the elastic seal 130 can be restrained from rotating relatively to the inner circumferential surface of the fitting part 121. Thus, if a sealing-target fluid comes into the fitted part between the fitting part 121 and the elastic seal 130 as the elastic seal 130 deteriorates over time or the like, the elastic seal 130 can be restrained from sliding on the inner circumferential surface of the fitting part 121 in the rotating direction. Thus, a reduction in the sealing efficiency can be suppressed. As a result, the sealing performance can be kept stable over a long period of time.

(Other Features)

Figure 5:
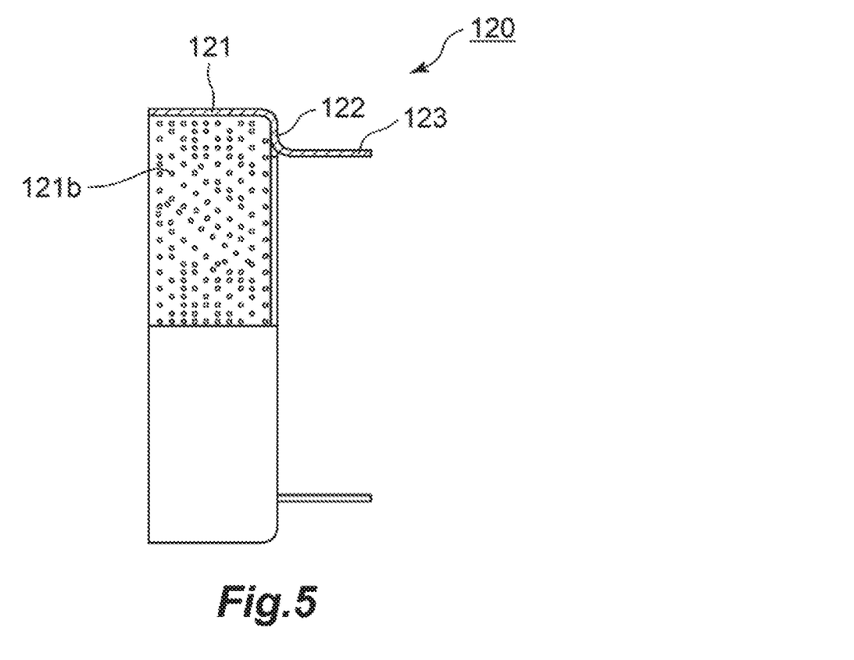
FIG. 5 is a partly sectional view of a case according to a first modification.
Figure 6:
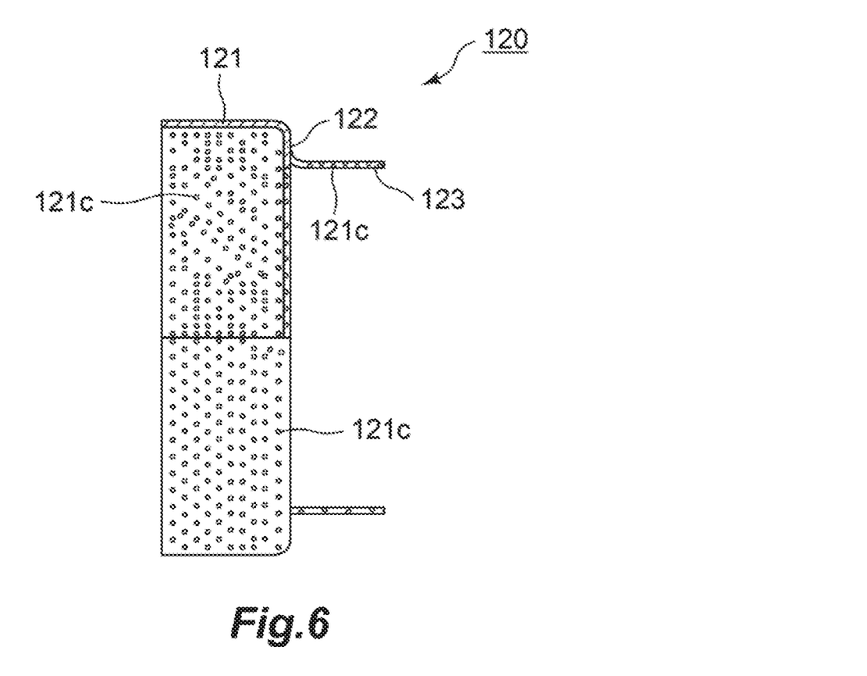
FIG. 6 is a partly sectional view of a case according to a second modification.
Figure 7:
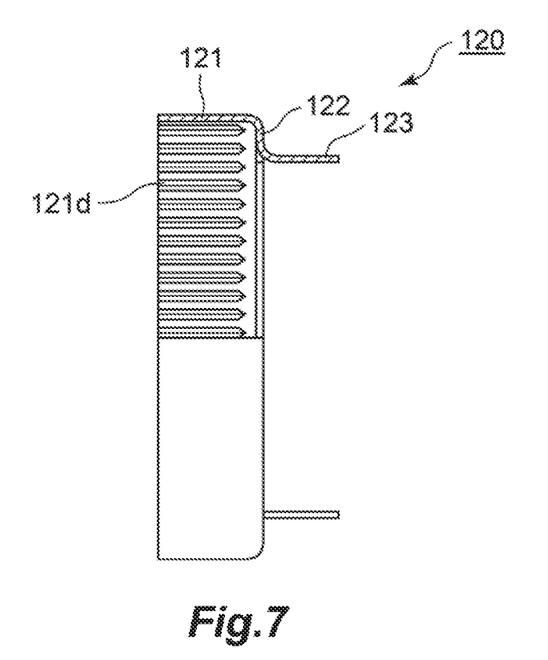
FIG. 7 is a partly sectional view of a case according to a third modification.
Figure 8:
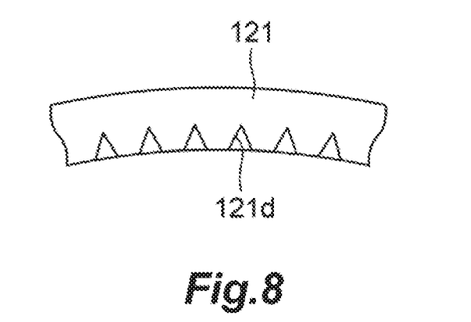
FIG. 8 illustrates a part of a front view of the case according to the third modification.
Figure 9:
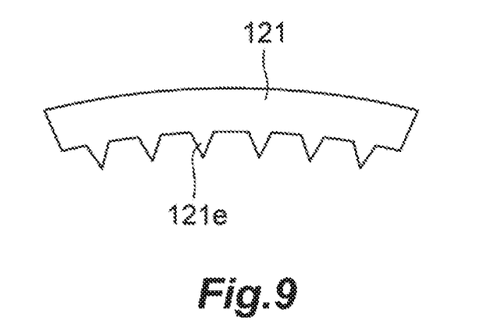
FIG. 9 is a part of a front view of a case according to a fourth modification.

Although the slipping stopper formed at the inner circumferential surface of the fitting part 121 of the case 120 according to the above described embodiment is the knurled part 121a, any other slipping stoppers may be used instead of the knurled part 121a if the elastic seal 130 can be restrained from rotating in the circumferential direction relatively to the fitting part 121. With reference to FIGS. 5 to 9, slipping stoppers according to modifications will be described. FIG. 5 is a partly sectional view of a case according to a first modification. FIG. 6 is a partly sectional view of a case according to a second modification. FIG. 7 is a partly sectional view of a case according to a third modification. In each of FIGS. 5 to 7, the part above the central axis of the mechanical seal is a sectional view of the case taken along a plane including the central axis, and the lower part illustrates the outer appearance of the case. FIG. 8 is a part of a front view of the case according to the third modification (as viewed from the left side in FIG. 7). FIG. 9 is a part of a front view of a case according to a fourth modification (which corresponds to a view from the left side in FIG. 7). The same components as those of the above described embodiment will be designated by the same reference numerals and detailed explanation thereof will be omitted.

In the first modification illustrated in FIG. 5, the inner circumferential surface of the fitting part 121 may be subjected to shot blasting processing, and a shot blasted part 121b may be provided. In this case, the surface roughness obtained by the shot blasting processing may be set 3 μmRz or larger ten-point mean roughness defined by JIS. In order to provide the shot blasted part 121b only in the inner circumferential surface of the fitting part 121, a part not to be subjected to the shot blasting processing may be masked. If a shot blasted part is provided at the part other than the inner circumferential surface of the fitting part 121, the product quality may not be affected. Therefore, as in the second modification illustrated in FIG. 6, the entire case 120 may be subjected to shot-blasting processing without masking. In this case, as illustrated in FIG. 6, a shot blasted part 121c is provided on the entire case 120.

In the third modification illustrated in FIGS. 7 and 8, a plurality of recesses 121d which extend in the axial direction may be provided at the inner circumferential surface of the fitting part 121. In this case, the depth of the recess 121d may be set 0.03 mm or deeper. The inner circumferential surface of the fitting part 121 is formed by a cylindrical surface, and the recess 121d is formed by a part recessed from the inner circumferential surface formed by the cylindrical surface. In the fourth modification illustrated in FIG. 9, a plurality of protrusions 121e which extend in the axial direction may be provided at the inner circumferential surface of the fitting part 121. In this case, the height of the protrusion 121e may be set 0.03 mm or higher. The inner circumferential surface of the fitting part 121 is formed by a cylindrical surface, and the protrusion 121e is formed by a part protruding from the inner circumferential surface formed by the cylindrical surface. The recesses 121d in the third modification and the protrusions 121e in the fourth modification may be obtained by press working.

REFERENCE SIGNS LIST

10 Mechanical seal
100 Rotating ring unit
110 Rotating ring
111 Cylindrical part
112 Annular protrusion
120 Case
121 Fitting part
121a Knurled part
121b, 121c Shot blasted part
121d Recess
121e Protrusion
122 Inward flange part 123 Engaging protrusion
130 Elastic seal
131 First annular part
132 Curved part
133 Second annular part
140 Tightening member
141 Groove
200 Fixed ring unit
210 Fixed ring
220 Gasket
221 Cylindrical part
222 Inward flange part
300 Spring holder
400 Coil spring
500 Rotating shaft
600 Housing

The invention claimed is:

1. A mechanical seal which seals an annular gap between a rotating shaft and a housing having a shaft hole for the rotating shaft, the mechanical seal comprising:

a fixed ring fixed to the housing; and a rotating ring unit which includes a rotating ring configured to slide on the fixed ring and rotates together with the rotating shaft, the rotating ring unit including:

an annular elastic seal having a first annular part to which the rotating ring is fitted and thus fixed on an inner circumferential surface side thereof, a second annular part provided in close contact with an outer circumferential surface of the rotating shaft, and a curved part which connects the first and second annular parts and is configured to follow a positional change of the second annular part with respect to the first annular part;

an annular tightening member which tightens an outer circumferential surface of the second annular part on the rotating shaft; and a metal case including an annular fitting part to which the first annular part is fitted and thus fixed on an inner circumferential surface side thereof, wherein at least an axially extending part of the fitting part includes a processed part that has been processed to prevent slipping and is formed on an inner circumferential surface thereof, the processed part being configured to restrain the first annular part from rotating relatively in the circumferential direction, and the case comprises an engaging protrusion configured to engage an engagement part provided in the tightening member.

2. The mechanical seal of claim 1, wherein the case further comprises:

an inward flange part extending radially inwardly from an end of the fitting part; and the engaging protrusion extends from an end of the inward flange part to a side opposite to the rotating ring side.

3. The mechanical seal of claim 1, wherein the processed part is a knurled part.

4. The mechanical seal of claim 1, wherein the processed part is a shot blasted part.

5. The mechanical seal of claim 1, wherein the processed part includes a plurality of recesses or protrusions extending in an axial direction.

* * * * *